United States Patent
Stahl et al.

(10) Patent No.: US 11,338,848 B2
(45) Date of Patent: May 24, 2022

(54) ALIGNMENT OF STEERING CONTROLLER ANGLE AND MACHINE STEERING ANGLE FOR TRANSITIONING BETWEEN MANUAL AND AUTONOMOUS OPERATING MODES

(71) Applicant: Caterpillar Inc., Deerfield, IL (US)

(72) Inventors: Wendell Dean Stahl, Bradford, IL (US); Jeremy T. Peterson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 607 days.

(21) Appl. No.: 16/280,752

(22) Filed: Feb. 20, 2019

(65) Prior Publication Data

US 2020/0262475 A1 Aug. 20, 2020

(51) Int. Cl.
| | |
|---|---|
| *B62D 6/00* | (2006.01) |
| *B62D 5/06* | (2006.01) |
| *G05D 1/00* | (2006.01) |
| *B62D 15/02* | (2006.01) |
| *G05D 1/02* | (2020.01) |

(52) U.S. Cl.
CPC .............. *B62D 6/001* (2013.01); *B62D 5/06* (2013.01); *B62D 15/021* (2013.01); *G05D 1/0061* (2013.01); *G05D 1/0212* (2013.01)

(58) Field of Classification Search
CPC ........ B62D 6/001; B62D 5/06; B62D 15/021; B62D 5/5091; B62D 15/025; B62D 6/008; G05D 1/0061; G05D 1/0212
See application file for complete search history.

(56) References Cited

U.S. PATENT DOCUMENTS

| | | | | |
|---|---|---|---|---|
| 7,894,951 | B2* | 2/2011 | Norris | G05D 1/0061 |
| | | | | 701/36 |
| 10,112,639 | B2* | 10/2018 | Schulz | B62D 1/22 |
| 10,173,723 | B2* | 1/2019 | James | B62D 5/0409 |
| 10,766,518 | B2* | 9/2020 | Lubischer | B62D 1/183 |
| 10,780,915 | B2* | 9/2020 | Rakouth | B62D 15/025 |
| 2015/0191199 | A1* | 7/2015 | Tsubaki | B62D 15/025 |
| | | | | 701/42 |
| 2015/0362922 | A1* | 12/2015 | Dollinger | G05D 13/62 |
| | | | | 701/2 |
| 2016/0368522 | A1* | 12/2016 | Lubischer | B62D 1/183 |
| 2018/0178834 | A1 | 6/2018 | Moreillon et al. | |
| 2019/0118852 | A1* | 4/2019 | Suzuki | B60T 7/042 |
| 2021/0214003 | A1* | 7/2021 | Watanabe | B62D 6/008 |

FOREIGN PATENT DOCUMENTS

CN 106347449 A 1/2017

* cited by examiner

*Primary Examiner* — Thomas Ingram
(74) *Attorney, Agent, or Firm* — Harrity & Harrity LLP

(57) ABSTRACT

An electronic control unit (ECU) may receive, from an autonomous vehicle controller, an instruction to set a hydraulic steering actuator, of a vehicle, to a particular machine steering angle setting. The ECU may provide, to a steering controller torque device, a current to set a steering controller, of the vehicle, to a particular steering controller angle that corresponds to the particular machine steering angle setting. The ECU may provide, to a hydraulic control system, a current to set the hydraulic steering actuator to the particular machine steering angle setting.

19 Claims, 5 Drawing Sheets

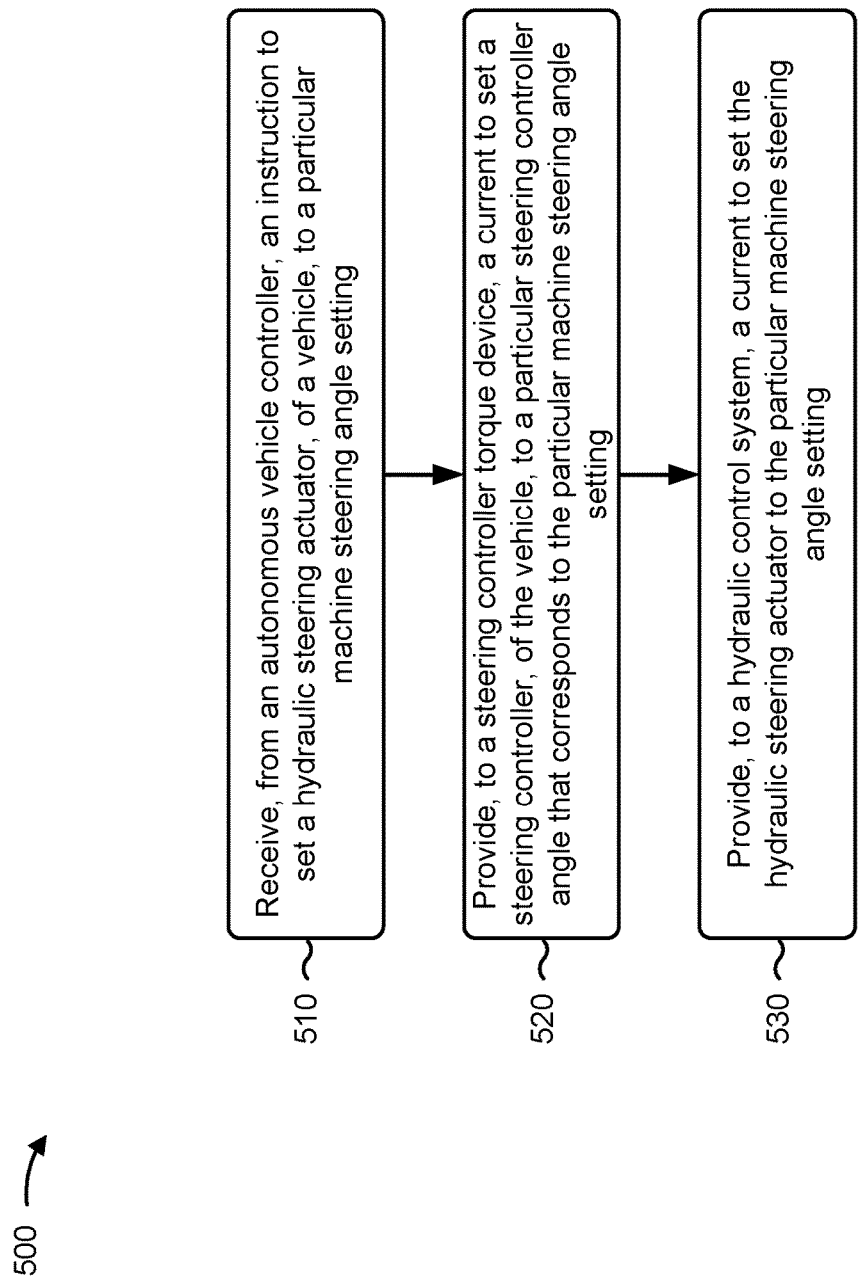

ALIGNMENT OF STEERING CONTROLLER ANGLE AND MACHINE STEERING ANGLE FOR TRANSITIONING BETWEEN MANUAL AND AUTONOMOUS OPERATING MODES

TECHNICAL FIELD

The present disclosure relates generally to steering systems and, more particularly, to alignment of steering controller angle and machine steering angle for transitioning between manual and autonomous operating modes.

BACKGROUND

A steering system, of a vehicle, can control the direction in which the vehicle travels. The steering system may be controlled in a manual operating mode by input that is provided by an operator via a steering controller of the vehicle and/or may be controlled in an autonomous operating mode by input that is provided by an autonomous vehicle controller. In some cases, the operation of the vehicle may be transitioned between the manual operating mode and the autonomous operating mode.

One approach to transitioning between a manual operating mode and an autonomous operating mode is disclosed in U.S. Pat. No. 7,894,951 that issued to Norris et al. on Feb. 22, 2011 ("the '951 patent"). In particular, the '951 patent discloses a "steering system 202" in which "a driver turns the steering controller 204, a shaft 206 attached to the steering controller 204 turns a gear that is intermeshed with a rack 207. The rack 207 is attached to the front wheels 208 of the vehicle 102 and causes the wheels 208 to turn in the appropriate direction based on the mechanical input." The '951 patent further discloses that "transition from autonomous to manual mode can be caused by specific controls (a changeover switch) or by operator intervention by use of an operator intervention detector on a manual control."

While the "operator intervention detector" of the '951 patent may permit the "transition from autonomous to manual mode" in a mechanically linked steering system, the '951 patent does not address transitioning from an autonomous operating mode and a manual operating mode in a non-mechanically-linked steering system, such as an electro-hydraulic steering system, in which a steering controller subsystem is not mechanically linked with a hydraulic steering actuator. Moreover, the '951 patent does not address providing feedback, to an operator, regarding the actions, associated with a steering system, that are performed by an autonomous vehicle controller, in which a steering controller subsystem is not mechanically linked with a hydraulic steering actuator.

The steering system of the present disclosure may be capable of providing feedback, to an operator of a vehicle, regarding actions, associated with a steering system, that are performed by an autonomous vehicle controller; may be capable of permitting efficient transition between manual and autonomous operating modes of the vehicle; and/or capable of solving other problems in the art.

SUMMARY

According to some implementations, a method may include receiving, at an electronic control unit (ECU) and from an autonomous vehicle controller, an instruction to set a hydraulic steering actuator, of a vehicle, to a particular machine steering angle setting; providing, by the ECU and to a steering controller torque device, a current to set a steering controller, of the vehicle, to a particular steering controller angle that corresponds to the particular machine steering angle setting; and providing, by the ECU and to a hydraulic control system, a current to set the hydraulic steering actuator to the particular machine steering angle setting.

According to some implementations, an electronic control unit (ECU) may include a memory; and one or more processors, communicatively coupled to the one or more memories, to: receive, from an autonomous vehicle controller, an instruction to set a hydraulic steering actuator, of a vehicle, to a particular machine steering angle setting; provide, to a steering controller torque device, a current to set a steering controller of the vehicle to a particular steering controller angle that corresponds to the particular machine steering angle setting; receive, at the ECU and from a steering controller angle sensor, information that identifies a steering controller angle of the steering controller; determine that the steering controller angle of the steering controller is set to the particular steering controller angle; subsequently determine that the steering controller angle is outside of a steering controller angle range, associated with the particular steering controller angle, as a result of a manual input provided via the steering controller; and control a hydraulic control system, of the vehicle, based on whether the steering controller angle is outside of the steering controller angle range for an amount of time that satisfies a threshold amount of time.

According to some implementations, a system may include a steering controller subsystem; a hydraulic machine steering subsystem, wherein the steering controller subsystem and the hydraulic machine steering subsystem are associated via an electronic control unit (ECU), and wherein the steering controller subsystem and the hydraulic machine steering subsystem are not mechanically linked; and the ECU, to: receive, from an autonomous vehicle controller, an instruction to set a hydraulic steering actuator, included in the hydraulic machine steering subsystem, to a particular machine steering angle setting; provide, to a steering controller torque device included in the steering controller subsystem, a current to set a steering controller, included in the steering controller subsystem, to a particular steering controller angle that corresponds to the particular machine steering angle setting; and provide, to a hydraulic control system included in the hydraulic machine steering subsystem, a current to set the hydraulic steering actuator to the particular machine steering angle setting.

BRIEF DESCRIPTION OF THE DRAWINGS

FIG. 5 is a flow chart of an example process for alignment of steering controller angle and machine steering angle for transitioning between manual and autonomous operating modes.

DETAILED DESCRIPTION

This disclosure relates to alignment of steering controller angle and machine steering angle for transitioning between manual and autonomous operating modes. The alignment of the steering controller angle and the machine steering angle may be performed by an electronic control unit (ECU) as described herein. The ECU described herein has universal applicability to any machine utilizing such an ECU. The term "machine" as used herein may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, aerial equipment, underground equipment, or marine equipment. Moreover, one or more implements may be connected to the machine and driven from the ECU.

Figure 1:
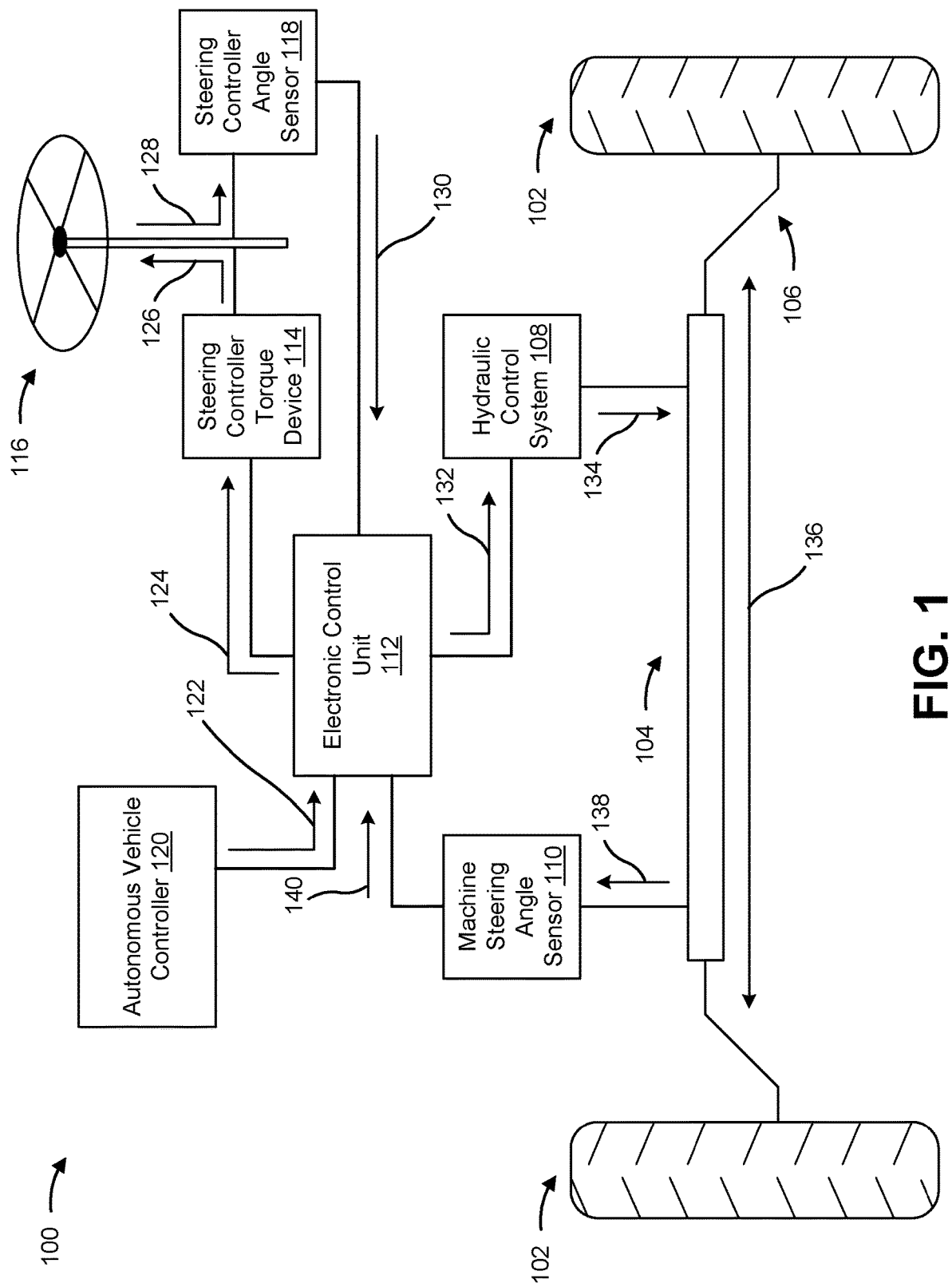
FIGS. 1-3 are diagrams of an example implementation described herein.
Figure 2:
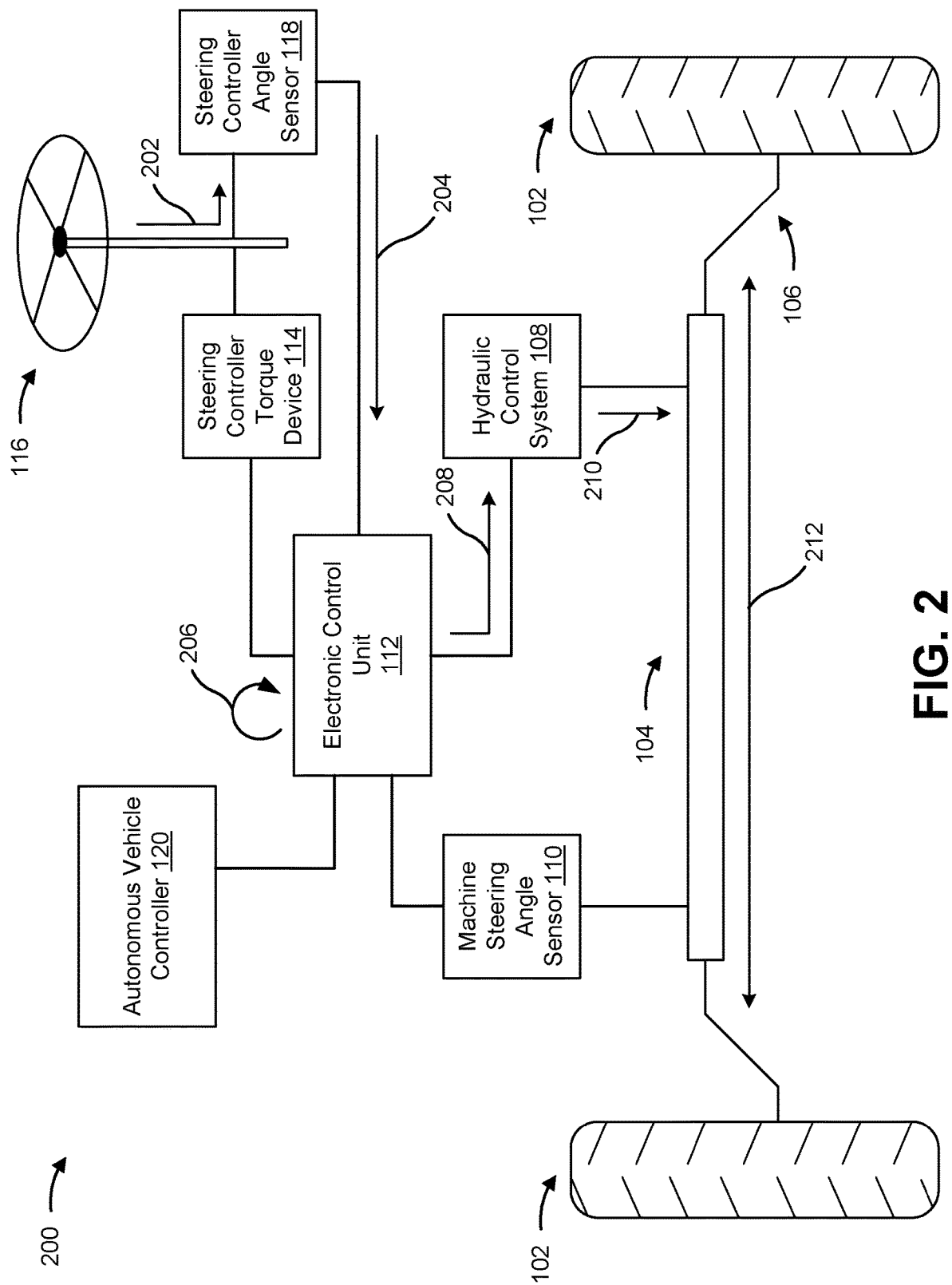
Figure 3:
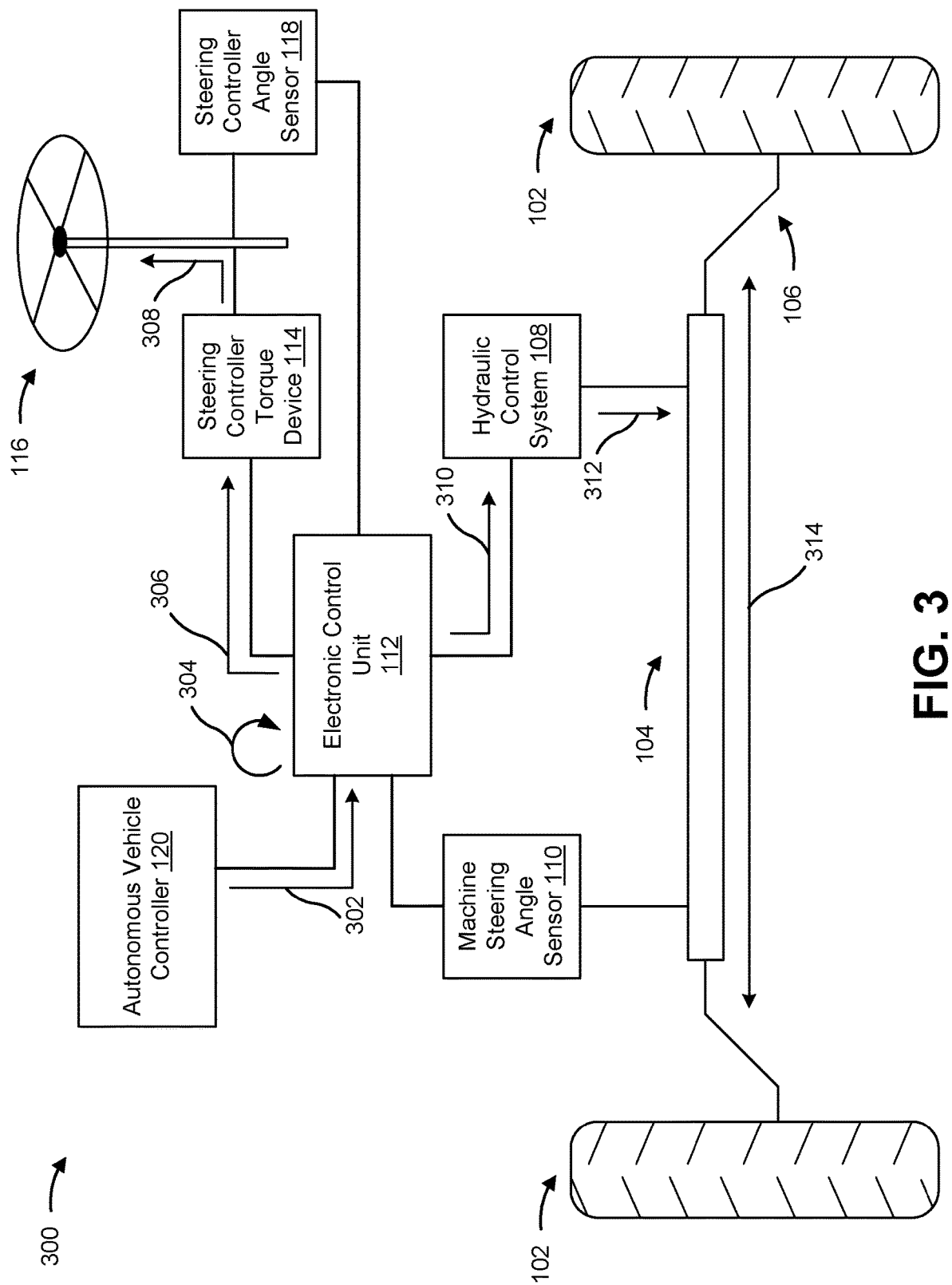

FIGS. 1-3 are diagrams of an example implementation 100 in which systems and/or methods, described herein, may be implemented. As shown in FIGS. 1-3, implementation 100 may include a steering system of a vehicle. The steering system may include a plurality of wheels (or treads) 102 connected to a hydraulic steering actuator 104 via a tie rod 106, may include a hydraulic control system 108, a machine steering angle sensor 110, an ECU 112, a steering controller torque device 114, a steering controller 116, a steering controller angle sensor 118, and an autonomous vehicle controller 120.

Hydraulic steering actuator 104, tie rod 106, hydraulic control system 108, and machine steering angle sensor 110 may be included in a hydraulic machine steering subsystem of the steering system, and steering controller torque device 114, steering controller 116, and steering controller angle sensor 118 may be included in an electrical steering controller subsystem of the steering system. The steering system may include an electro-hydraulic steering system in which the electrical steering controller subsystem and the hydraulic machine steering system are not mechanically linked and are only communicatively and/or electrically associated via ECU 112.

The machine steering subsystem may control the orientation and/or direction of wheels 102, relative to the vehicle, to direct the vehicle in a particular direction of travel. Hydraulic steering actuator 104 may include one or more hydraulic cylinders that receive a hydraulic fluid from hydraulic control system 108, and convert the pressure of the hydraulic fluid into a linear force that is applied to tie rod 106. Hydraulic control system 108 may include a valve, a fluid motor, fluid pump, fluid reservoir, and/or the like, that may receive an input (e.g., a control signal such as an electrical current or a voltage, an electronic communication via a communication bus, and/or the like) from ECU 112, and may supply hydraulic fluid to hydraulic steering actuator 104 based on the input. Machine steering angle sensor 110 may measure a machine steering angle of hydraulic steering actuator 104, which may refer to a position of tie rod 106 relative to hydraulic steering actuator 104, and may provide information identifying the machine steering angle (e.g., a voltage, an electrical current, a resistance, an inductance, an impedance, an electronic communication, and/or the like) to various components included in the steering system, such as ECU 112, autonomous vehicle controller 120, and/or the like.

The steering controller subsystem may control a steering controller angle of steering controller 116. The steering controller angle of steering controller 116 may refer to an angle at which steering controller 116 is rotated, translated, or otherwise displaced. The steering controller angle of steering controller 116 and the machine steering angle of hydraulic steering actuator 104 may be associated via a steering ratio (e.g., a ratio that specifies how a magnitude of change in steering controller angle translates to a magnitude of change in machine steering angle, such as a 20:1 ratio, a 50:1 ratio, and/or the like). To control the steering controller angle of steering controller 116, steering controller torque device 114 may receive an input from ECU 112 (e.g., an electrical current, a voltage, an electronic communication, and/or the like) and may apply a torque, based on the input, to steering controller 116 to rotate, translate, or otherwise displace steering controller 116 to change the steering controller angle of steering controller 116.

Steering controller 116 may include a steering wheel, a steering lever, a steering shaft, and/or any other type of input device that may be used, by an operator of the vehicle, to provide manual steering input to ECU 112. Accordingly, the steering controller angle of steering controller 116 may include a steering wheel angle, a steering lever angle, a steering shaft angle, and/or the like.

The steering system may be capable of operating in various operating modes, such as a manual operating mode, an autonomous operating mode, and/or the like. In the manual operating mode, ECU 112 may control the machine steering angle of hydraulic steering actuator 104 based on manual input, provided by an operator of the vehicle, via steering controller 116. For example, the operator may provide the manual input by turning or rotating steering controller 116. Steering controller angle sensor 118 may determine, based on the manual input, the steering controller angle of steering controller 116 and may provide, to ECU 112, an indication of the steering controller angle. The indication may include an electrical current, a voltage, a resistance, an electronic communication, and/or the like.

ECU 112 may provide an input (e.g., an electrical current, a voltage, an electronic communication, and/or the like), to hydraulic control system 108, to control the machine steering angle based on the steering controller angle. ECU 112 may determine the input based on the indication of the steering controller angle, provided by steering controller angle sensor 118, may determine the input based on an initial machine steering angle of hydraulic steering actuator 104, as indicated by machine steering angle sensor 110, and/or the like. For example, ECU 112 may determine the input based on the translating the steering controller angle to a machine steering angle, may determine a difference between the machine steering angle and the initial machine steering angle of hydraulic steering actuator 104 (e.g., the amount of electrical current, provided by ECU 112 may increase as the difference between the machine steering angle and the initial machine steering angle increases, and may decrease as the difference between the machine steering angle and the initial machine steering angle decreases).

Hydraulic control system 108 may receive the input from ECU 112 and may supply hydraulic fluid to hydraulic steering actuator 104 to displace tie rod 106 to set the machine steering angle based on the steering controller angle.

In the autonomous operating mode, and as shown by reference number 122, ECU 112 may receive a particular machine steering angle setting from autonomous vehicle controller 120, and may control the hydraulic steering subsystem, based on the particular machine steering angle setting, to set the machine steering angle, of hydraulic steering actuator 104, to the particular machine steering angle setting. Autonomous vehicle controller 120 may determine the particular machine steering angle setting based on an autonomous path of travel of the vehicle, based on an initial machine steering angle of hydraulic steering actuator 104 (e.g., as indicated by machine steering angle sensor 110), based on a speed of travel of the vehicle, based on a command or instruction received from a remote operator (e.g., an operator that is located remotely from the vehicle), and/or the like. For example, autonomous vehicle controller 120 may determine that, in order for the vehicle to remain on the autonomous path of travel, the machine steering angle of hydraulic steering actuator 104 needs to be set to the particular machine steering angle setting based on the speed of travel of the vehicle. Autonomous vehicle controller 120 may provide, to ECU 112, the particular machine steering angle setting based on determining that the initial machine steering angle and the particular machine steering angle setting are different machine steering angles.

In some implementations, autonomous vehicle controller 120 may determine the autonomous path of travel. For example, autonomous vehicle controller may receive an input that specifies a destination and may determine the autonomous path of travel from a location of the vehicle to the destination. In some implementations, autonomous vehicle controller 120 may receive the autonomous path of travel as input to autonomous vehicle controller 120.

When the steering system is operating in the autonomous operating mode, ECU 112 may align the steering controller angle of steering controller 116 with the machine steering angle of hydraulic steering actuator 104. In this way, the operator of the vehicle receives a visual indication (e.g., via rotation of steering controller 116) as to the changes to the machine steering angle that are made by ECU 112 based on input from autonomous vehicle controller 120. Moreover, in this way, if the operator decides to transition the steering system into the manual operating mode, the steering controller angle of steering controller 116 is already aligned with the machine steering angle of hydraulic steering actuator 104, which permits a smooth and efficient transition between the autonomous operating mode and the manual operating mode.

To align the steering controller angle to the machine steering angle, and as shown by reference number 124, ECU 112 may provide, to steering controller torque device 114, an input (e.g., an electrical current, a voltage, an electronic communication, and/or the like) to set steering controller 116 to a particular steering controller angle that corresponds to the particular machine steering angle setting. In some implementations, ECU 112 may determine the particular steering controller angle based on a steering ratio, as described above. Moreover, ECU 112 may determine the input (e.g., the amount of electrical current, the amount of voltage, and/or the like) based on an initial steering controller angle of steering controller 116 (e.g., based on a difference between the initial steering controller angle and the particular steering controller angle).

In some implementations, ECU 112 may determine the input based on a difference between the particular steering controller angle and an initial steering controller angle of the steering controller and a difference between an initial machine steering angle of the hydraulic steering actuator and the steering controller angle. The difference between an initial machine steering angle of the hydraulic steering actuator and the particular machine steering angle is associated with a first torque component, and the difference between the particular steering controller angle and the initial steering controller angle is associated with a second torque component. ECU 112 may determine the input to cause steering controller torque device 114 to apply a torque to steering controller 116 that is based on a weighted sum of the first torque component and the second torque component. In some cases, when the second torque component is 0, the weighting for the first torque component may be 1 and the weighting for the second torque component may be zero. In some cases, when the second torque component is not 0, and the sign of the second torque component and the first torque component do not match, the weighting for the first torque component is 0 and the weighting for the second torque component is 1. In some cases, when the sign of the second torque component and the first torque component match, the larger magnitude torque component (regardless of sign) may be a weighting of 1, and the other torque component may be a weighting of 0. The weighting of torque components may apply to similar concepts with fractional weighting and concepts or controlled rate on weighting transitions. Each torque component may be saturated to a maximum, vary with specific angle error, be constant for angle error, or any combination for a range of angle error.

As shown by reference number 126, steering controller torque device 114 may receive the input and may translate the input into a torque that is applied to steering controller 116 to rotate, translate, or otherwise move steering controller 116 to the particular steering controller angle. When the steering system is operating in the autonomous operating mode, the amount of torque that is applied to steering controller 116 may be limited to an amount of torque that permits the operator of the vehicle to override the torque to take manual control of the steering system.

As shown by reference number 128, steering controller angle sensor 118 may measure the steering controller angle of steering controller 116 and may provide information identifying the steering controller angle (e.g., a voltage, an electrical current, a resistance, an inductance, an impedance, an electronic communication, and/or the like) to ECU 112. In this way, ECU 112 may receive the information identifying the steering controller angle as feedback, and may continue to provide the input to steering controller torque device 114 until the steering controller angle of steering controller 116 is set to the particular steering controller angle determined by ECU 112.

As shown by reference number 132, ECU 112 may provide, to hydraulic control system 108, an input (e.g., an electrical current, a voltage, an electronic communication, and/or the like) to set hydraulic steering actuator 104 to the particular machine steering angle setting. In some implementations, to set hydraulic steering actuator 104 to the particular machine steering angle setting, ECU 112 may directly convert the particular machine steering angle setting, received from autonomous vehicle controller 120, to the input. In some implementations, ECU 112 may set the machine steering angle based on the steering controller angle of steering controller 116 (e.g., as indicated by steering controller angle sensor 118), which was set by ECU 112 based on the particular machine steering angle setting. In this way, ECU 112 may implicitly set the machine steering angle to the particular machine steering angle setting.

As shown by reference number 134, hydraulic control system 108 may receive the input and may supply hydraulic fluid to hydraulic steering actuator 104, based on the input, to set the machine steering angle to the particular machine steering angle setting. As shown by reference number 136, hydraulic steering actuator 104 may receive the hydraulic fluid, may convert a pressure of the hydraulic fluid into a linear force that is applied to tie rod 106 to turn or rotate tires 102 based on the particular machine steering angle setting. As shown by reference number 138, machine steering angle sensor 110 may measure the machine steering angle of hydraulic steering actuator 104, and may provide information identifying the machine steering angle (e.g., a voltage, an electrical current, a resistance, an inductance, an impedance, an electronic communication, and/or the like) to various components included in the steering system, such as ECU 112, autonomous vehicle controller 120, and/or the like.

Turning to FIG. 2, in some cases, the operator of the vehicle may desire to take control of the steering system (e.g., to deviate from the autonomous path of travel, to avoid an obstacle that may be located in the autonomous path of travel, and/or the like). Accordingly, and as shown by reference number 202, the operator may provide a manual input, via steering controller 116, to transition the steering system from the autonomous operating mode to the manual operating mode. The manual input may overcome the torque that is applied by steering controller torque device 114 to steering controller 116 (e.g., as part of aligning the steering controller angle of steering controller 116 to the machine steering angle of hydraulic steering actuator 104 in the autonomous operating mode) to deviate the steering controller angle from the particular steering controller angle that was determined by ECU 112 based on the particular machine steering angle setting.

As shown by reference number 204, steering controller angle sensor 118 may measure the steering controller angle of steering controller 116 and may provide information identifying the steering controller angle (e.g., a voltage, an electrical current, a resistance, an inductance, an impedance, an electronic communication, and/or the like) to ECU 112. Steering controller torque device 114 may also measure an amount of torque being applied to steering controller 116 by the operator, and may provide, to ECU 112, information identifying the amount of torque (e.g., a voltage, an electrical current, a resistance, an inductance, an impedance, an electronic communication, and/or the like).

As shown by reference number 206, ECU 112 may determine whether to transition the steering system from the autonomous operating mode to the manual operating mode based on the manual input provided by the operator via steering controller 116. ECU 112 may determine whether to transition the steering system from the autonomous operating mode to the manual operating mode based on the information identifying the steering controller angle, based on the information identifying the amount of torque, and/or the like.

For example, ECU 112 may determine to transition to the manual operating mode based on determining that the steering controller angle is outside of a steering controller angle range associated with the particular steering controller angle (e.g., +/−1 degree, +/−5 degrees, and/or the like), may determine to transition to the manual operating mode based on determining that the steering controller angle is outside of the steering controller angle range for an amount of time that satisfies a threshold amount of time (e.g., 1 second, 3 seconds, and/or the like), may determine to transition to the manual operating mode based on determining that the amount of torque applied to steering controller 116 is outside of a torque range associated with the torque applied by steering controller torque device 114 (e.g., +/−1% of the torque applied by steering controller torque device 114, +/−5%, and/or the like), may determine to transition to the manual operating mode based on determining that the amount of torque is outside of the torque range for an amount of time that satisfies a threshold amount of time (e.g., 1 second, 3 seconds, and/or the like), and/or the like.

As another example, ECU 112 may determine to transition to the manual operating mode based on a cumulative sum of the error between the actual or initial steering controller angle and the particular steering controller angle exceeding an error threshold which can be dependent on machine operating conditions as an example travel speed. The cumulative sum may also be reset based on certain conditions such as instantaneous error less than a threshold, changing sign, and such like. Also, the determination to transition may be based on a rolling, fixed duration cumulative sum exceeding a threshold which may also be dependent on machine operating conditions.

In some implementations, instead of transitioning the steering system into the manual operating mode based on error between the actual or initial steering controller angle and the particular steering controller angle, the operator may use the error to signal, to ECU 112 and/or autonomous vehicle controller 120, a selection of a new path of autonomous travel for the vehicle. For example, ECU 112 and/or autonomous vehicle controller 120 may determine that the error is an indication to direct the vehicle along a new path of autonomous travel based on the error satisfying another error threshold that is less than the error threshold for transitioning the steering system into the manual operating mode. In some implementations, ECU 112 and/or autonomous vehicle controller 120 may provide a notification (e.g., visual, audio, haptic, and/or the like) that ECU 112 and/or autonomous vehicle controller 120 is selecting a new path of autonomous travel based on the error. In some implementations, ECU 112 and/or autonomous vehicle controller 120 may provide a notification (e.g., visual, audio, haptic, and/or the like) to the operator to select the new path of autonomous travel based on the error.

As shown by reference number 208, ECU 112 may provide, to hydraulic control system 108, an input to control the hydraulic steering subsystem based on whether ECU 112 determines to transition the steering system from the autonomous operating mode to the manual operating mode. If ECU 112 determines to transition the steering system to the manual operating mode, ECU 112 may determine the input based on the steering controller angle, as measured by steering controller angle sensor 118, that resulted from the manual input provided by the operator via steering controller 116. Accordingly, ECU 112 may disregard inputs that are received from autonomous vehicle controller 120 and may instead control the hydraulic steering subsystem based on the operator's input.

If ECU 112 determines not to transition the steering system to the manual operating mode, ECU 112 may continue to control the machine steering angle of hydraulic steering actuator 104 based on inputs that are received from autonomous vehicle controller 120. Moreover, ECU 112 may provide an input to steering controller torque device 114 to correct any deviations of the steering controller angle from the particular steering controller angle that was determined by ECU 112. In this way, if the operator momentarily moves steering controller 116 from the particular steering controller angle, ECU 112 may return steering controller 116 to the particular steering controller angle to align the steering controller angle of steering controller 116 with the machine steering angle of hydraulic steering actuator 104.

As shown by reference number 210, hydraulic control system 108 may receive the input (e.g., based on the steering controller angle if ECU 112 determines to transition the steering system to the manual operating mode or based on the particular machine steering angle setting if ECU 112 determines not to transition the steering system to the manual operating mode) and may supply hydraulic fluid to hydraulic steering actuator 104, based on the input and, as shown by reference number 212, hydraulic steering actuator 104 may receive the hydraulic fluid, may convert a pressure of the hydraulic fluid into a linear force that is applied to tie rod 106 to turn or rotate tires 102.

Turning to FIG. 3, in some cases, the steering system may transition from the manual operating mode to the autonomous operating mode, such as when the steering system detects an absence of intervention with the autonomous operation of the steering system, when the steering system detects an absence of operator input on steering controller 116, and/or the like. In some implementations, the steering system may initially (or by default) operate in the manual operating mode, and may or may not subsequently transition to the autonomous operating mode. As shown by reference number 302, ECU 112 may continue to receive inputs from autonomous vehicle controller 120 while the steering system is operating in the manual operating mode. For example, autonomous vehicle controller 120 may continue to provide, to ECU 112, steering angle settings based on the autonomous path of travel for the vehicle, while ECU 112 may continue to control the hydraulic steering subsystem based on the steering controller angle which can be influenced by the operator.

As shown by reference number 304, ECU 112 may receive a particular machine steering angle setting and may determine whether to control the hydraulic steering subsystem based on the particular machine steering angle setting (and thus, whether to transition the steering system from the manual operating mode to the autonomous operating mode). ECU 112 may determine whether to control the hydraulic steering subsystem based on the particular machine steering angle setting based on various factors, such as whether the vehicle is located within a threshold distance of the autonomous path of travel (e.g., 100 feet, 500 feet, and/or the like), such as the speed at which the vehicle is traveling, such as a direction in which the vehicle is traveling (e.g., relative to the autonomous path of travel), such as whether there is a safe path that the vehicle may traverse to return to the autonomous path of travel, and/or the like.

As another example, ECU 1120 may determine to transition the steering system from the manual operating mode to the autonomous operating mode based on determining that on a cumulative sum of the error between actual steering controller angle and the particular steering controller angle does not satisfy a threshold cumulative sum error. The determination may be based on reset conditions for the cumulative sum based on reduced error threshold, or rolling, fixed duration cumulative sum is more than a threshold which may be speed dependent.

In some implementations, ECU 112 may determine to transition the steering system from the manual operating mode to the autonomous operating mode based on receiving the particular machine steering angle setting from autonomous vehicle controller 120. In this case, autonomous vehicle controller 120 may determine whether to transition the steering system from the manual operating mode to the autonomous operating mode based on the various criteria and/or factors described above, and may provide the particular machine steering angle setting to ECU 112 as an implicit indication for ECU 1120 to transition the steering system from the manual operating mode to the autonomous operating mode.

If ECU 112 determines to control the hydraulic steering subsystem based on the particular machine steering angle setting, ECU 112 may automatically transition the steering system from the manual operating mode to the autonomous operating mode and may provide an indication to the operator of the transition (e.g., a notification on a dashboard or control center of the vehicle, an audio notification such as a tone, a voice indication, and/or the like, a tactile or haptic indication, and/or the like). ECU 112 may first request permission from the operator to transition the steering system from the manual operating mode to the autonomous operating mode (e.g., by providing a request, on the dashboard or control center of the vehicle, for the operator to permit the transition of the steering system from the manual operating mode to the autonomous operating mode, an audio notification such as a tone, a voice indication, and/or the like, a tactile or haptic indication, and/or the like) and may transition the steering system from the manual operating mode to the autonomous operating mode based on receiving the permission from the operator. If ECU 112 determines to control the hydraulic steering subsystem based on the steering controller angle setting, ECU 112 may automatically transition the steering system from the autonomous operating mode to the manual operating mode and may, at the time of transition or in advance, provide an indication to the operator of the transition (e.g., a notification on a dashboard or control center of the vehicle, an audio notification such as a tone, a voice indication, and/or the like, a tactile or haptic indication, and/or the like).

As shown by reference number 306, if ECU 112 determines to control the hydraulic steering subsystem based on the particular machine steering angle setting, ECU 112 may provide, to steering controller torque device 114, an input (e.g., an electrical current, a voltage, an electronic communication, and/or the like) to set steering controller 116 to a particular steering controller angle that corresponds to the particular machine steering angle setting. As shown by reference number 308, steering controller torque device 114 may receive the input and may translate the input into a torque that is applied to steering controller 116 to rotate, translate, or otherwise move steering controller 116 to the particular steering controller angle.

As shown by reference number 310, if ECU 112 determines to control the hydraulic steering subsystem based on the particular machine steering angle setting, ECU 112 may provide, to hydraulic control system 108, an input (e.g., an electrical current, a voltage, an electronic communication, and/or the like) to set hydraulic steering actuator 104 to the particular machine steering angle setting. As shown by reference number 312, hydraulic control system 108 may receive the input and may supply hydraulic fluid to hydraulic steering actuator 104, based on the input. As shown by reference number 314, hydraulic steering actuator 104 may receive the hydraulic fluid, may convert a pressure of the hydraulic fluid into a linear force that is applied to tie rod 106 to turn or rotate tires 102.

As indicated above, FIGS. 1-3 are provided as examples. Other examples may differ from what is described in connection with FIGS. 1-3.

Figure 4:
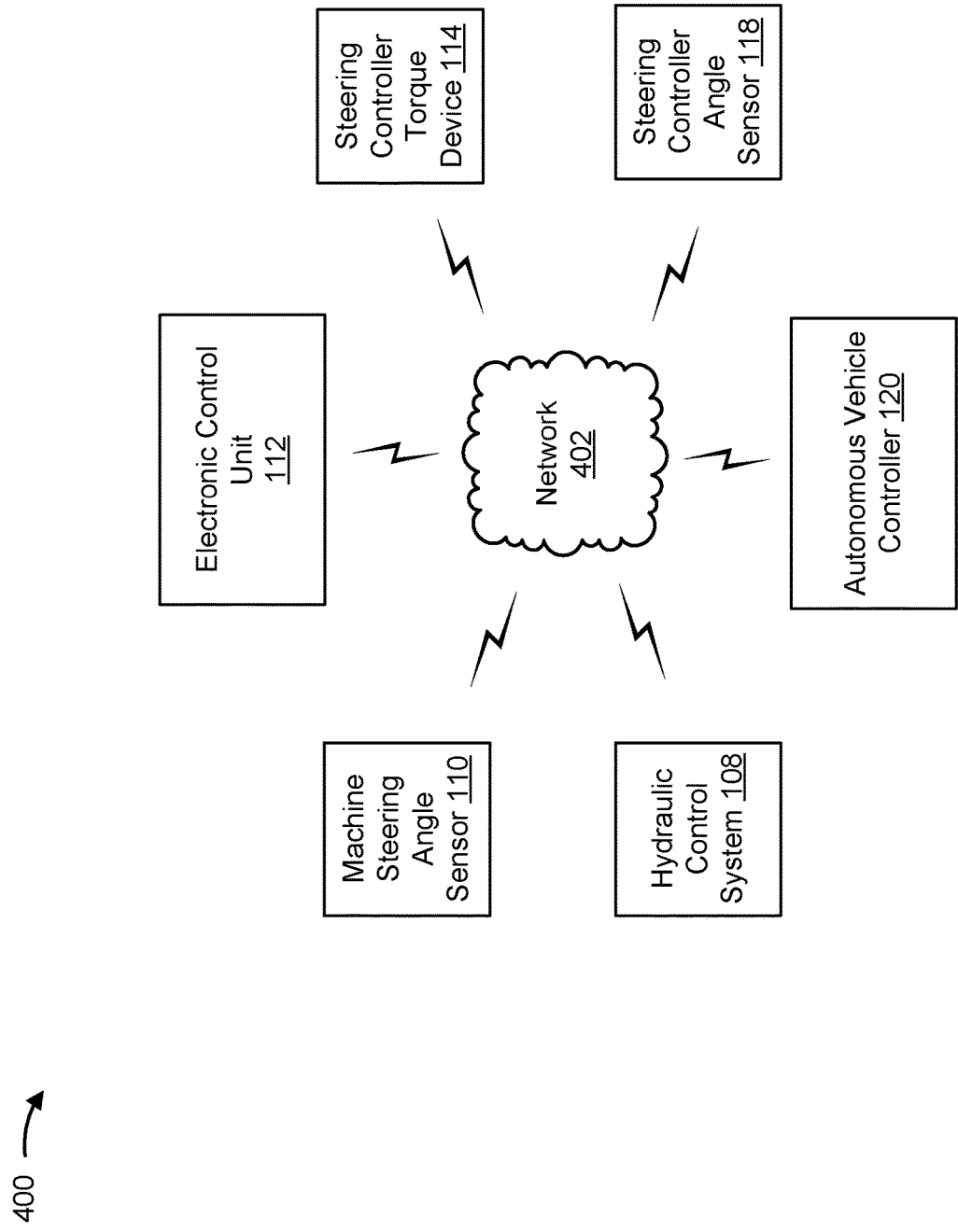
FIG. 4 is diagram of an example environment in which systems and/or methods described herein may be implemented.

FIG. 4 is a diagram of an example environment 400 in which systems and/or methods described herein may be implemented. As shown in FIG. 4, environment 400 may include hydraulic control system 108, machine steering angle sensor 110, ECU 112, steering controller torque device 114, steering controller angle sensor 118, autonomous vehicle controller 120, and a network 402. Devices and/or components of environment 400 may be included in a steering system of a vehicle, and may interconnect via wired connections, wireless connections, or a combination of wired and wireless connections.

Hydraulic control system 108 may include one or more devices or components configured to receive an input from ECU 112 and provide hydraulic fluid to a hydraulic steering actuator (e.g., hydraulic steering actuator 104) based on the input. For example, hydraulic control system 108 may include a valve, a fluid motor, fluid pump, fluid reservoir, and/or the like.

Machine steering angle sensor 110 may include one or more devices or components configured to measure a machine steering angle of the hydraulic steering actuator. For example, machine steering angle sensor 110 may include a linear variable differential transformer (LVDT), a rotary variable differential transformer (RVDT), and/or another type of position sensor, angle sensor, or displacement sensor that is capable of measuring the steering controller angle and converting the steering controller angle to an electrical current, a voltage, a resistance, an inductance, an electronic communication, and/or the like.

ECU 112 may include one or more devices or components configured to align a steering controller angle and a machine steering angle for transitioning the steering system between manual and autonomous operating modes. For example, ECU 112 may receive, from autonomous vehicle controller 120, an instruction to set the hydraulic steering actuator to a particular machine steering angle setting, may provide, to a steering controller torque device 114, a current to set a steering controller (e.g., steering controller 116), of the vehicle, to a particular steering controller angle that corresponds to the particular machine steering angle setting, and may provide, to hydraulic control system 108, a current to set the hydraulic steering actuator to the particular machine steering angle setting.

ECU 112 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may implemented in hardware, firmware, and/or a combination of hardware and software. ECU 112 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by ECU 112. ECU 112 may include a memory (e.g., a non-transitory computer-readable medium) capable of storing instructions, that when executed, cause the processor to perform one or more processes and/or methods described herein.

Steering controller torque device 114 may include one or more devices or components configured to apply a torque to the steering controller to set the steering controller to a particular steering controller angle. For example, steering controller torque device 114 may include a torque motor and/or another type of torque controller that is capable of receiving an input from ECU 112 and applying the torque to the steering controller based on the input.

Steering controller angle sensor 118 may include one or more devices or components configured to measure a steering controller angle of the steering controller. For example, steering controller angle sensor 118 may include a linear variable differential transformer (LVDT), a rotary variable differential transformer (RVDT), and/or another type of position sensor, angle sensor, or displacement sensor that is capable of measuring the steering controller angle and converting the steering controller angle to an electrical current, a voltage, a resistance, an inductance, an electronic communication, and/or the like.

Autonomous vehicle controller 120 may include one or more devices or components configured to generate instructions, for ECU 112, to steer the vehicle based on an autonomous path of travel for the vehicle. For example, autonomous vehicle controller 120 may determine the autonomous path of travel, may receive information identifying the autonomous path of travel, and/or the like, and may provide, to ECU 112, an instruction to set the hydraulic steering actuator to a particular machine steering angle setting.

Autonomous vehicle controller 120 may be implemented as a processor, such as a CPU, a GPU, an APU, a microprocessor, a microcontroller, a DSP, an FPGA, an ASIC, or another type of processing component. The processor may be implemented in hardware, firmware, and/or a combination of hardware and software. Autonomous vehicle controller 120 may include one or more processors capable of being programmed to perform a function. One or more memories, including a RAM, a ROM, and/or another type of dynamic or static storage device (e.g., a flash memory, a magnetic memory, and/or an optical memory) may store information and/or instructions for use by autonomous vehicle controller 120. Autonomous vehicle controller 120 may include a memory (e.g., a non-transitory computer-readable medium) capable of storing instructions, that when executed, cause the processor to perform one or more processes and/or methods described herein.

Network 402 includes one or more wired and/or wireless networks. For example, network 402 may include a sensor network, a controller area network (CAN), an Ethernet-based network, a cellular network, a Wi-Fi network, a Bluetooth network, and/or the like.

The number and arrangement of devices and networks shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a flow chart of an example process 500 for alignment of steering controller angle and machine steering angle for transitioning between manual and autonomous operating modes. In some implementations, one or more process blocks of FIG. 5 may be performed by an ECU (e.g., ECU 112). In some implementations, one or more process blocks of FIG. 5 may be performed by another device or a group of devices separate from or including the ECM, such a hydraulic steering actuator (e.g., hydraulic steering actuator 104), a hydraulic control system (e.g., hydraulic control system 108), a machine steering angle sensor (e.g., machine steering angle sensor 110), a steering controller torque device (e.g., steering controller torque device 114), a steering controller angle sensor (e.g., steering controller angle sensor 118), an autonomous vehicle controller (autonomous vehicle controller 120), and/or the like.

As shown in FIG. 5, process 500 may include receiving, from an autonomous vehicle controller, an instruction to set a hydraulic steering actuator, of a vehicle, to a particular machine steering angle setting (block 510). For example, the ECU (e.g., using a processor, a memory, and/or the like) may receive, from an autonomous vehicle controller, an instruction to set a hydraulic steering actuator, of a vehicle, to a particular machine steering angle setting, as described above. The particular machine steering angle setting may be based on an initial machine steering angle of the hydraulic steering actuator, may be based on an autonomous path of travel specified by the autonomous vehicle controller, and/or the like.

As further shown in FIG. 5, process 500 may include providing, to a steering controller torque device, a current to set a steering controller, of the vehicle, to a particular steering controller angle that corresponds to the particular machine steering angle setting (block 520). For example, the ECM (e.g., a processor, a memory, and/or the like) may provide, to a steering controller torque device, a current to set a steering controller, of the vehicle, to a particular steering controller angle that corresponds to the particular machine steering angle setting, as described above. The steering controller and the hydraulic steering actuator may not be mechanically linked and, accordingly, the ECU may set the steering controller to the particular steering controller angle that corresponds to the particular machine steering angle setting for efficient transitioning between manual and autonomous operating modes. The ECU may provide the current to the steering controller torque device based on an initial steering controller angle of the steering controller. For example, the ECU may receive, from a steering controller angle sensor, the initial steering controller angle of the steering controller, may determine that the initial steering controller angle and the particular steering controller angle are different steering controller angles, and may provide the current to the steering controller torque device based on a difference between the initial steering controller angle and the particular steering controller angle.

The ECU may determine the current is based on a difference between the particular steering controller angle and an initial steering controller angle of the steering controller and a difference between an initial machine steering angle of the hydraulic steering actuator and the steering controller angle. The difference between an initial machine steering angle of the hydraulic steering actuator and the particular machine steering angle is associated with a first torque component, and the difference between the particular steering controller angle and the initial steering controller angle of the steering controller may be associated with a second torque component. The current may cause the steering controller torque device to apply a torque to the steering controller that is based on a weighted sum of the first torque component and the second torque component. The first torque component and the second torque component are at least one of: saturated to a maximum, vary with specific angle error, and/or constant for angle error.

As further shown in FIG. 5, process 500 may include providing, to a hydraulic control system, a current to set the hydraulic steering actuator to the particular machine steering angle setting (block 530). For example, the ECM (e.g., using a processor, a memory, and/or the like) may provide, to a hydraulic control system, a current to set the hydraulic steering actuator to the particular machine steering angle setting, as described above. The ECU may provide the current to the hydraulic control system based on the initial machine steering angle of the hydraulic steering actuator. For example, the ECU may receive the initial machine steering angle from a machine steering angle sensor, may determine that the initial machine steering angle and the particular machine steering angle setting are different machine steering angles, and may provide the current to the hydraulic control system based on a difference between the initial machine steering angle and the particular machine steering angle setting.

Process 500 may include additional implementations, such as any single implementation or any combination of implementations described below and/or in connection with one or more other processes described elsewhere herein.

The ECU may determine that the steering controller angle, of the steering controller, is set to the particular steering controller angle, may subsequently determine that the steering controller angle is outside of a steering controller angle range, associated with the particular steering controller angle, as a result of a manual input provided via the steering controller, and may determine whether to transition the vehicle from an autonomous operating mode to a manual operating mode based on whether the steering controller angle is outside of the steering controller angle range for an amount of time that satisfies a threshold amount of time.

For example, the ECU may transition, based on determining that the steering controller angle is outside of the steering controller angle range for an amount of time that satisfies a threshold amount of time, the vehicle from the autonomous operating mode to the manual operating mode by controlling the hydraulic control system based on the manual input provided via the steering controller. In this case, the ECU may control the hydraulic control system, when transitioning to the manual operating mode, by providing, to the hydraulic control system, a current to set the hydraulic steering actuator to a machine steering angle that corresponds to the steering controller angle of the steering controller.

As another example, the ECU may operate the vehicle in the autonomous operating mode based on determining that the steering controller angle is outside of the steering controller angle range for an amount of time that does not satisfy the threshold amount of time. In this case, the ECU may continue to control the hydraulic control system based on the particular machine steering angle setting, and may provide, to the steering controller torque device, a current to move the steering controller from the steering controller angle to the particular steering controller angle that corresponds to the particular machine steering angle setting.

As another example, the ECU may determine a cumulative sum error of the steering controller angle relative to the particular steering controller angle as a result of a manual input provided via the steering controller, and may control, based on determining that the cumulative sum error of the steering controller angle relative to the particular steering controller angle exceeds a threshold, the hydraulic control system based on the manual input provided via the steering controller.

When controlling the hydraulic control system in the manual operating mode, the ECU may receive, from the autonomous vehicle controller, another instruction to set the hydraulic steering actuator to another particular machine steering angle setting, and may determine whether to provide a current to set the hydraulic steering actuator to the other particular machine steering angle setting (and thus, whether to transition the steering system from the manual operating mode to the autonomous operating mode). The ECU may determine whether to provide the current to set the hydraulic steering actuator to the other particular machine steering angle setting based on various factors, such as the vehicle being within a threshold distance of an autonomous path of travel that is specified by the autonomous vehicle controller, such as a speed at which the vehicle is traveling, such as a direction in which the vehicle is traveling, and/or the like. The ECU may provide, to an operator of the vehicle, an indication that the ECU is to transition the vehicle into an autonomous operating mode by providing the current to set the hydraulic steering actuator to the other particular machine steering angle setting, and may receive, from the operator and based on the indication, an instruction to transition the vehicle into the autonomous operating mode.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed electronic control unit (ECU) (e.g., ECU 112) may be used, in any steering system in which a steering controller subsystem and a machine steering subsystem are electrically connected but not mechanically linked, to align a steering controller angle and a machine steering angle. In this way, an operator of a vehicle in which the steering system is included may receive a visual indication (e.g., via movement of a steering controller, such as steering controller 116) as to changes that are made to a machine steering angle of a hydraulic steering actuator (e.g., hydraulic steering actuator 104) based on input from an autonomous vehicle controller (e.g., autonomous vehicle controller 120).

Moreover, since the disclosed ECU ensures that the steering controller angle of the steering controller is aligned with the machine steering angle of the hydraulic steering actuator, if the operator decides to transition the steering system into the manual operating mode, the disclosed ECU permits a smoother and faster transition between the autonomous operating mode and the manual operating mode than if the steering controller angle and the machine steering angle were misaligned. In addition, this reduces wear and tear on the steering system and/or other systems of the vehicle that would otherwise have been caused by quick and forceful jerking of the mechanical steering subsystem to align the steering controller angle and the mechanical steering angle during the transition. Further, this reduces the risk of a safety hazard for the operator of the vehicle occurring due to the misalignment of the steering controller angle and the mechanical steering angle (e.g., that could be caused by the steering controller angle pointing in a direction that would cause the vehicle to travel off of a road or another safe path of travel).

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   receiving, at an electronic control unit (ECU) and from an autonomous vehicle controller, an instruction to set a hydraulic steering actuator, of a vehicle, to a particular machine steering angle setting;
   providing, by the ECU and to a steering controller torque device, a current to set a steering controller, of the vehicle, to a particular steering controller angle that corresponds to the particular machine steering angle setting; and
   providing, by the ECU and to a hydraulic control system, a current to set the hydraulic steering actuator to the particular machine steering angle setting,
      wherein providing the current to the hydraulic control system comprises:
   receiving, from a machine steering angle sensor, an initial machine steering angle of the hydraulic steering actuator;
   determining that the initial machine steering angle and the particular machine steering angle setting are different machine steering angles; and
   providing the current to the hydraulic control system based on a difference between the initial machine steering angle and the particular machine steering angle setting.

2. The method of claim 1, wherein the steering controller torque device and the hydraulic control system are associated via the ECU; and
   wherein the steering controller and the hydraulic steering actuator are not mechanically linked.

3. The method of claim 1, wherein providing the current to the steering controller torque device comprises:
   receiving, from a steering controller angle sensor, an initial steering controller angle of the steering controller;
   determining that the initial steering controller angle and the particular steering controller angle are different steering controller angles; and
   providing the current to the steering controller torque device based on a difference between the initial steering controller angle and the particular steering controller angle.

4. The method of claim 1, wherein the instruction to set the hydraulic steering actuator to the particular machine steering angle setting is based on an initial machine steering angle of the hydraulic steering actuator.

5. The method of claim 1, further comprising:
   determining that a steering controller angle, of the steering controller, is set to the particular steering controller angle;
   subsequently determining a cumulative sum error of the steering controller angle relative to the particular steering controller angle as a result of a manual input provided via the steering controller; and controlling, based on determining that the cumulative sum error of the steering controller angle relative to the particular steering controller angle exceeds a threshold, the hydraulic control system based on the manual input provided via the steering controller.

6. The method of claim 1, further comprising:
determining that a steering controller angle, of the steering controller, is set to the particular steering controller angle;
subsequently determining that the steering controller angle is outside of a steering controller angle range, associated with the particular steering controller angle, as a result of a manual input provided via the steering controller; and
controlling, based on determining that the steering controller angle is outside of the steering controller angle range for an amount of time that does not satisfy a threshold amount of time, the steering controller torque device to set the steering controller to the particular steering controller angle that corresponds to the particular machine steering angle setting.

7. An electronic control unit (ECU), comprising:
a memory; and
one or more processors, communicatively coupled to the memory, to:
receive, from an autonomous vehicle controller, an instruction to set a hydraulic steering actuator, of a vehicle, to a particular machine steering angle setting;
provide, to a steering controller torque device, a current to set a steering controller, of the vehicle, to a particular steering controller angle that corresponds to the particular machine steering angle setting;
receive, at the ECU and from a steering controller angle sensor, information that identifies a steering controller angle of the steering controller;
determine that the steering controller angle, of the steering controller, is set to the particular steering controller angle;
subsequently determine that the steering controller angle is outside of a steering controller angle range, associated with the particular steering controller angle, as a result of a manual input provided via the steering controller; and
control a hydraulic control system, of the vehicle, based on whether the steering controller angle is outside of the steering controller angle range for an amount of time that satisfies a threshold amount of time.

8. The ECU of claim 7, wherein the steering controller torque device and the hydraulic control system are associated via the ECU; and
wherein the steering controller and the hydraulic steering actuator are not mechanically linked.

9. The ECU of claim 7, wherein the one or more processors, when controlling the hydraulic control system based on whether the steering controller angle is outside of the steering controller angle range for the amount of time that satisfies the threshold amount of time, are to:
determine that the steering controller angle is outside of the steering controller angle range for the amount of time that satisfies the threshold amount of time; and
control, based on determining that the steering controller angle is outside of the steering controller angle range for the amount of time that satisfies the threshold amount of time, the hydraulic control system based on the manual input provided via the steering controller.

10. The ECU of claim 9, wherein the one or more processors, when controlling the hydraulic control system based on the manual input provided via the steering controller, are to:
provide, to the hydraulic control system, a current to set the hydraulic steering actuator to a machine steering angle that corresponds to the steering controller angle of the steering controller.

11. The ECU of claim 9, wherein the one or more processors are further to:
receive, from the autonomous vehicle controller when controlling the hydraulic control system based on the manual input provided via the steering controller, another instruction to set the hydraulic steering actuator to another particular machine steering angle setting;
determine, based on receiving the other instruction, that the vehicle is within a threshold distance of an autonomous path of travel that is specified by the autonomous vehicle controller; and
provide, to the hydraulic control system, a current to set the hydraulic steering actuator to the other particular machine steering angle setting.

12. The ECU of claim 7, wherein the one or more processors, when controlling the hydraulic control system based on whether the steering controller angle is outside of the steering controller angle range for the amount of time that satisfies the threshold amount of time, are to:
determine that the steering controller angle is outside of the steering controller angle range for an amount of time that does not satisfy the threshold amount of time; and
control, based on determining that the steering controller angle is outside of the steering controller angle range for the amount of time that does not satisfy the threshold amount of time, the steering controller torque device to set the steering controller to the particular steering controller angle that corresponds to the particular machine steering angle setting.

13. The ECU of claim 12, wherein the one or more processors, when controlling the steering controller torque device to set the steering controller to the particular steering controller angle that corresponds to the particular machine steering angle setting, are to:
provide, to the steering controller torque device, the current to move the steering controller from the steering controller angle to the particular steering controller angle that corresponds to the particular machine steering angle setting.

14. A system, comprising:
a steering controller subsystem;
a hydraulic machine steering subsystem,
wherein the steering controller subsystem and the hydraulic steering subsystem are associated via an electronic control unit (ECU), and
wherein the steering controller subsystem and the hydraulic machine steering subsystem are not mechanically linked; and
the ECU, to: receive, from an autonomous vehicle controller, an instruction to set a hydraulic steering actuator, included in the hydraulic machine steering subsystem, to a particular machine steering angle setting;
provide, to a steering controller torque device included in the steering controller subsystem, a current to set a steering controller, included in the steering controller subsystem, to a particular steering controller angle that corresponds to the particular machine steering angle setting, wherein the current to set the steering controller to the particular steering controller angle is based on:
  a difference between an initial steering controller angle of the steering controller and the particular steering controller angle, and
  a difference between an initial machine steering angle of the hydraulic steering actuator and the particular machine steering angle; and
provide, to a hydraulic control system included in the hydraulic machine steering subsystem, a current to set the hydraulic steering actuator to the particular machine steering angle setting.

15. The system of claim 14, wherein the difference between the initial machine steering angle of the hydraulic steering actuator and the particular steering controller angle is associated with a first torque component;
  wherein the difference between the particular machine steering angle, and an initial steering controller angle of the steering controller is associated with a second torque component;
  wherein the current to set the steering controller to the particular steering controller angle causes the steering controller torque device to apply a torque to the steering controller that is based on a weighted sum of the first torque component and the second torque component; and
  wherein the first torque component and the second torque component are at least one of:
  saturated to a maximum,
  vary with specific angle error, or
  constant for angle error.

16. The system of claim 14, wherein the ECU is further to:
  subsequently determine that a steering controller angle, of the steering controller, is outside of a steering controller angle range, associated with the particular steering controller angle, as a result of a manual input provided via the steering controller; and
  control, based on determining that the steering controller angle is outside of the steering controller angle range for an amount of time that satisfies a threshold amount of time, the hydraulic control system based on the manual input provided via the steering controller.

17. The system of claim 16, wherein the ECU is further to:
  receive, from the autonomous vehicle controller when controlling the hydraulic control system based on the manual input provided via the steering controller, another instruction to set the hydraulic steering actuator to another particular machine steering angle setting; and
  determine, based on receiving the other instruction, to provide, to the hydraulic control system, a current to set the hydraulic steering actuator to the other particular machine steering angle setting.

18. The system of claim 17, wherein the ECU, when determining to provide the current to set the hydraulic steering actuator to the other particular machine steering angle setting, is to:
  determine to provide the current to set the hydraulic steering actuator to the other particular machine steering angle setting based on at least one of:
    a vehicle, associated with the ECU, being within a threshold distance of an autonomous path of travel that is specified by the autonomous vehicle controller,
    a speed at which the vehicle is traveling, or
    a direction in which the vehicle is traveling;
  provide, to an operator of the vehicle, an indication that the ECU is to transition the vehicle into an autonomous operating mode by providing the current to set the hydraulic steering actuator to the other particular machine steering angle setting; and
  receive, from the operator and based on the indication, an instruction to transition the vehicle into the autonomous operating mode.

19. The system of claim 14, wherein the current to set the steering controller to the particular steering controller angle is based on an initial steering controller angle of the steering controller; and
  wherein the instruction to set the hydraulic steering actuator to the particular machine steering angle setting is based on an initial machine steering angle of the hydraulic steering actuator.

* * * * *